United States Patent Office 3,627,547
Patented Dec. 14, 1971

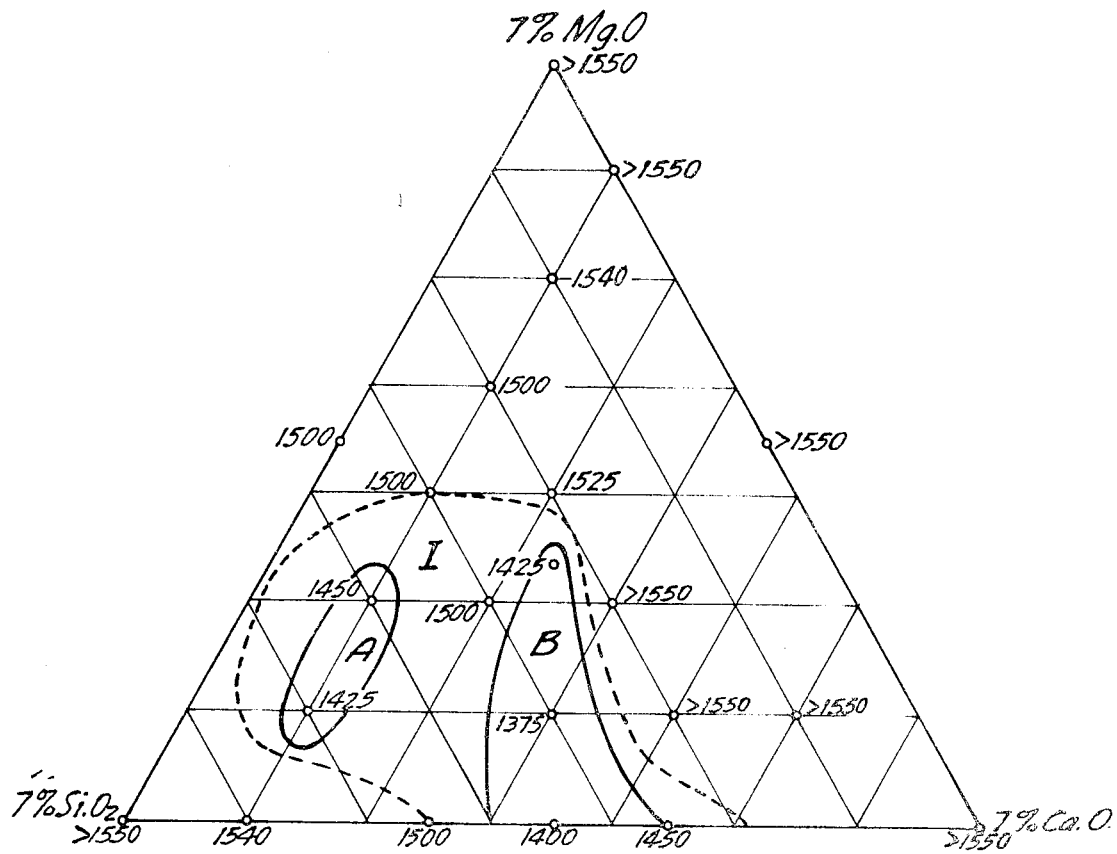

3,627,547
HIGH ALUMINA BODIES COMPRISING ANORTHITE, GEHLENITE AND SPINEL
Joseph T. Bailey, Hixson, Tenn., assignor to American Lava Corporation, Chattanooga, Tenn.
Continuation-in-part of application Ser. No. 831,911, June 10, 1969. This application June 19, 1969, Ser. No. 834,803
Int. Cl. C04b 33/00
U.S. Cl. 106—39 R      5 Claims

ABSTRACT OF THE DISCLOSURE

Frits containing 80–97% $Al_2O_3$ which mature to useful ceramics at about 1350° to 1500° C. are provided. Pre-reaction of finely divided reactive $Al_2O_3$ with $SiO_2$ and CaO in ratios of about 5:1 to 3:5 (optionally up to a total of ⅓ of the oxides other than $Al_2O_3$ being MgO) provides the unique family of frits MgO and CaO and may be employed as carbonates.

---

This application is a continuation-in-part of copending application Ser. No. 831,911 filed June 10, 1969.

This invention relates to alumina frits which mature to dense ceramics below 1500° C. and contain from about 80 to 97 percent by weight alumina. In particular alumina bodies containing about 90–95 percent alumina are prepared. The invention further relates to a process for the preparation of such frits.

High alumina ceramics which mature at relatively low firing temperatures offer advantages from several standpoints. The present invention is illustrated by exemplary preferred compositions containing 93 weight percent $Al_2O_3$ maturing in the range of 1300 to 1450° C., and in less preferred aspects up to about 1500° C., as against 1600° C. or more for conventional alumina ceramics containing 93% of alumina. The lower firing temperature provides advantages such as the ability to use electrically heated furnaces, less expensive gas-fired kiln construction, lower fuel or electricity costs, lower refractory costs, and longer life for setters, firing plates, etc. High temperature gas-fired kilns are normally used for the conventional higher firing compositions.

A major and more significant advantage of the low firing alumina materials of this invention is in the realm of substrates for thick film hybrid integrated circuits. In this application it is desirable to apply electronic circuit patterns, for example by screening a metal paste or slurry, on an unfired ceramic substrate and then to fire or sinter both the metal and the substrate in one firing operation. Palladium, sintering about 1300–1475° C., is especially suitable. This technique is useful in multiple layer laminates to provide buried metal conductor paths within a fired ceramic. Further, it is desirable for the finished substrate having metal patterns buried and/or on the surface to be stable at elevated temperature under oxdizing conditions. Thick film passive components can then be applied and the assembly fired in air at temperatures in the range of 700 to 1000° C. Successive operations can be carried out at lower temperatures, all in air, without the disadvantages of easily oxidized refractory metals such as tungsten.

Conventionally prepared high alumina ceramic compositions, that is, those which mature at temperatures in excess of 1500° C., usually in excess of 1600° C., must use higher melting metals such as tungsten to form compatible ceramic-metal systems to yield substrates with exposed and/or buried metal conductors in one firing operation. These units are not stable in air at elevated temperatures and require protective atmospheres, for example hydrogen or cracked ammonia. Further air firing operations are therefore precluded.

The low-firing alumina bodies of the present invention mature below 1500° C., and, even more advantageously, in certain preferred embodiments at 1350 to 1450° C. This permits the use of air stable noble metals, such as palladium, for exposed and/or buried metal conductor patterns and a single operation for firing. This firing may be accomplished under oxidizing conditions eliminating the inconvenience and additional cost of protective atmospheres. Further operations may be accomplished, such as application of thick film passive components which are fired in air at about 700 to 1000° C., without the necessity for complex apparatus or special conditions.

In conventional procedures high alumina ceramics for example 93% $Al_2O_3$ bodies, containing additives such as $SiO_2$, MgO and CaO, are usually prepared by utilizing a technical ceramic grade aluminum oxide powder as the basic ingredient—for example a 99.7% alumina powder having a mean particle size of about 4 microns and low content of soda. The $SiO_2$ and MgO normally may be added as talc (a magnesium silicate) and clay (an aluminum silicate, for example kaolin), and the CaO may be added as $CaCO_3$ or possibly as wollastonite (a calcium silicate). During sintering, there is little solid state reaction and formation of anorthite and/or gehlenite or, when MgO is used, of spinel since reactivity of the relatively coarse alumina powder is low, and activation energy is required for breakdown of talc and clay before the oxides contained therein are available for reaction with other components. Thus, high maturing temperatures are required, and the mechanism of densification is one of liquid phase sintering wherein an essentially glassy bond is formed by reactions between the CaO, $SiO_2$, MgO, and $Al_2O_3$. In addition, the clay and talc normally contain undesirable impurities such as the $TiO_2$ associated with most clays.

In U.S. Pat. 3,167,438, a commercial alumina is used together with ultra fine silica, magnesium hydroxide and calcium carbonate and even after ball-milling in water for 16 hours it is found that densification of compositions compacted at 10 tons/in.$^2$ requires firing at 1600° for compositions close to those used therein. Further heating at 1200–1300° C. for up to 60 hours is then needed to promote devitrification of the glassy bond and recrystallization of spinel, anorthite and/or gehlenite.

One object of this invention is to provide fireable alumina ceramics containing about 80–97% alumina and fireable at 1500° C. or less. Other objects will become evident hereinafter.

A special ceramic base which possesses excellent electrical and mechanical properties and yet is compatible with palladium circuitry, i.e., matures below 1475° C., and particularly below 1425°–1475° C., is provided as a 93% alumina with limited amounts of silica and calcia. It is desirable that the maturing temperature be above about 1300° C. so that palladium particles of ink used in circuitry will be sintered together. Optionally magnesia may be used as a fourth ingredient and is effective to lower the maturing temperature and improve acid resistance. Alkali metals are avoided in order to avoid the formation of relatively conductive glassy phases which cause undesirably high electrical losses. It is therefore most desirable to employ relatively pure reactive materials such as 99.7% or purer reactive alumina, a relatively pure technical grade of $CaCO_3$, U.S.P. grade of $MgCO_3$ and fine grained silica. Particle sizes of each are preferably about 0.5–10μ although some larger particles can be tolerated. These are combined in proportions so that the composition after firing includes, for examples, 93% $Al_2O_3$ and the remaining 7% may be about 3.5% each of CaO and SiO$_2$ or about 2.33% each of CaO, MgO and SiO$_2$. These proportions are exemplary without intending thereby to exclude equivalent compositions approximating these proportions. The compositions are especially interpreted with reference to FIG. 1.

FIG. 1 is a section through the tetrahedral phase diagram in which compositions of Al$_2$O$_3$, MgO, SiO$_2$ and CaO are plotted. The section is taken at 93% alumina and shows the maturing temperatures of various compositions made under identical conditions. The area enclosed by the broken line (designated I) includes compositions containing up to 3% of MgO maturing at 1500° C. or lower. Within that area are two irregular areas designated A and B which include especially compositions maturing at about 1450° C. or lower. Although shown as two areas it is not impossible that they may be in fact continuous at some composition, for example, by including the undetermined point of 1% MgO, 2% CaO and 4% SiO$_2$. All the compositions are, however, essentially equivalent to those described as containing about equal parts of CaO, SiO$_2$ and optionally magnesia.

It will be recognized that the areas I and A and B are actually sections through solid figures in the tetrahedron. As such they exemplify compositions having equivalent properties but with which percentage of Al$_2$O$_3$ may vary broadly over a range of about 80 to 97% and preferably 90 to 95%. At much higher Al$_2$O$_3$ contents it is not likely that maturation is fully achieved as low as 1500° C. and at lower alumina contents maturation temperatures drop to the point where cosintering of materials may be difficult without distortion of the ceramic.

It will be evident from a consideration of the phase diagram of the system Al$_2$O$_3$, CaO, SiO$_2$ that even in the absence of MgO, ternary eutectics exist as low as 1165° C. This phase diagram is reproduced and discussed for example, in Findlay, The Phase Rule and its Applications, pp. 231–235, 8th ed. New York, 1938. A more recent version is provided in E. F. Osborn and A. Muau, page 630, "Phase Diagrams for Ceramists," publ. by American Ceramics Society, Inc., Columbus, Ohio (1964). This diagram, however, represents equilibrium conditions at a very low alumina content and is actually a higher temperature than one might expect for maturing a ceramic of that composition. In order to be assured that the major solid phase is Al$_2$O$_3$, compositions should include at least 80% Al$_2$O$_3$ and mature from about 1300° to 1475° C. It may be noted that some compositions may be susceptible to maturing at lower temperatures but will not be adversely affected by maturation at least at 1300° C.

As noted above SiO$_2$ and CaO are used in approximately equal proportions and MgO may also be present optionally in equal proportions. From FIG. 1 it will be apparent that the amount of MgO should not be over one third of the added components (i.e., CaO, SiO$_2$ and MgO) although SiO$_2$ to CaO ratio may vary over proportions of from 5 to 1 to 3 to 5 and preferably over proportions of 5 to 3 to 3 to 5.

The broadly useful compositions of the invention therefore include compositions containing from 80 to 97 percent of alumina, up to one third of the balance being MgO and the remainder SiO$_2$ and CaO in ratios of from 5:1 to 3:5. A preferred range of compositions are those containing 90–95 percent of alumina with the same relative proportions of MgO, CaO and SiO$_2$. A still more preferred range of compositions are those containing 90–95 percent of alumina and about equal amount of CaO, SiO$_2$ and optionally MgO. The compositions are preferably ground to sizes in the range of 0.5 to 10 microns before use.

The compositions are prepared by a special procedure which insures substantial interreaction of the 3 or 4 components. It has been found that a dry ball-milled alumina (prepared for example, as described in U.S. Pats. 3,274,311 or 3,358,937) is advantageously used together with silica and oxides or carbonates of magnesium and calcium. All have particles sizes below about 2–3 microns on the average. The alumina is preferably below 2 microns and may average about 1.3 to 1.9 microns or lower, for example, a 0.6$\mu$ mean crystal size. The fine-grained silica which is used may have particles size averaging about 1.1 microns. The carbonates or oxides are light powders and are reactive. They are therefore preferred in producing frits and ceramics by process of the invention but equivalent materials may be employed. The characteristic of all the materials is that they are reactive. It is found that the reactivity of these materials is best used in accordance with this invention by first combining the selected amounts of the reactants.

The selected ingredients are first converted to a prefired condition which is herein referred to as a ceramic frit. The finely powdered oxides and carbonates are wet ball-milled with about an equal weight of deionized water for about 1–4 hours and the pasty mass is dried to a cake either with or without prior filtration to remove part of the liquid. The dried cake is calcined or prereacted, for example, at about 1100° to 1200° C. for 2–5 hours, in an electric furnace to effect preliminary reaction with elimination of CO$_2$ from carbonates and some interreaction of oxides. After cooling the clinker is crushed to a granular size (below 8 mesh; about 2–3 mm.). The gravel is dry ball-milled (using a conventional grinding aid such as 1% of triethanolamine) with ten-fold of balls for 10–20 hours to micron size in the range of about 0.5 to 10 microns and preferably about 0.5 to 5 microns. The resultant dry powder is termed a ceramic frit because it has been partially reacted by solid state reactions and is therefore less subject to volume changes on firing to maturity. The triethanolamine grinding aid also acts as a binder for pressing shapes from the ceramic frit. Wet milling may be used for grinding the granules if desired, for example 6 hours using 3 to 1 ball to dry charge ratio. The frit is collected and dried. An organic binder is added as desired.

The ceramic frit appears to be largely crystalline and reacted. In addition to a large proportion of alumina, the frit includes partially reacted solid crystalline phases of anorthite and/or gehlenite and, when MgO is present, of spinel and equivalent metastable compositions. The frit then matures to a highly crystalline dense ceramic between about 1300–1475° C. and below 1500° C. but at temperatures 200–400° C. above the temperature at which pre-reacted. Unlike densification of alumina ceramics made by conventional procedures, densifying appears to proceed by solid state reactions without any formation of a glassy phase. The fired ceramic is therefore cemented by intercrystalline growth as shown by essentially complete absence of glassy phase or even devitrified glassy phase. It is remarkable that the crystalline structure remains quite small and that crystalline growth as to size is substantially inhibited. The phases present are shown by X-ray diffraction analysis to be 80–90% $\alpha$-alumina with varying amounts of spinel (MgAl$_2$O$_4$), anorthite (CaAl$_2$Si$_2$O$_8$) and/or gehlenite (Ca$_2$Al$_2$SiO$_7$) in proportions determined by the overall composition.

The ceramic frit is treated as a ceramic material which may be pressed as a dry powder or may be blended with binders, plasticizers or other materials and then extruded or cast into desired shapes. It may be made into a thin paste-like medium and screened onto previously prepared green or fired substrates. A particularly convenient method is to blend with a polymeric binder, and if desired plasticizers, and cast (e.g., by knife-coating) onto a flexible support as described in U.S. Pat. 2,966,719 to give a leathery green sheet or tape containing usually about 20–30% of binder from about 0.1 to 0.8 mm. thick which is especially adapted for use in producing substrates.

The invention is now illustrated by examples showing how various compositions of the invention are prepared and comparative results obtained by other processes.

EXAMPLE 1

This example is intended to show how the points of FIG. 1 are determined. Mixtures of reactive alumina of mean particle size 1.6µ, finely ground silica (1.1µ mean particle size), $CaCO_3$ (Technical grade) and where necessary $MgCO_3$ (U.S.P. grade) are prepared corresponding to the compositions on FIG. 1 as shown in the following table. Each batch is wet-milled for 2 hours, dried and calcined at 1100° C. for 3 hours. The resultant clinker is dry-milled for 10 hours with 1% of triethanolamine using 10:1 ball:charge ratio. About 3 percent of an organic binder such as polyvinyl alcohol is incorporated and the material is granulated through a 60 mesh (about 0.2 mm.) screen. Samples of the frit are molded under pressure and fired to densification and maturity at temperatures from 1300° up to 1550° C. It is known that the binary compositions of $Al_2O_3$ with single components will not mature at 1550° C. and the apices in FIG. 1 are thus marked (>1550).

TABLE 1
[All 97% $Al_2O_3$]

| $SiO_2$, percent | CaO, percent | MgO, percent | Temperature |
|---|---|---|---|
| 3.5 |  | 3.5 | 1,500 |
|  | 3.5 | 3.5 | >1,550 |
| 6.0 | 1.0 |  | 1,540 |
| 4.5 | 2.5 |  | 1,500 |
| 3.5 | 3.5 |  | 1,400 |
| 2.5 | 4.5 |  | 1,450 |
| 5.0 | 1.0 | 1.0 | 1,425 |
| 3.0 | 3.0 | 1.0 | 1,375 |
| 2.0 | 4.0 | 1.0 | >1,550 |
| 1.0 | 5.0 | 1.0 | >1,550 |
| 4.0 | 1.0 | 2.0 | 1,450 |
| 3.0 | 2.0 | 2.0 | 1,500 |
| 2.0 | 3.0 | 2.0 | >1,550 |
| 2.33 | 2.33 | 2.33 | 1,425 |
| 3.0 | 1.0 | 3.0 | 1,500 |
| 2.0 | 2.0 | 3.0 | 1,525 |
| 2.0 | 1.0 | 4.0 | 1,500 |
| 1.0 | 1.0 | 5.0 | 1,540 |
|  | 1.0 | 6.0 | >1,550 |

The maturation temperatures are the minimum temperatures at which densification occurs. The actual density reached varies somewhat with compositions. The areas in FIG. 1 designated as I and A and B are delimited by interpolation from the above data and hence are approximate in outline.

EXAMPLE 2

This example illustrates variations in procedure and the advantages of the process of the invention.

Compositions of 93% $Al_2O_3$, 5.0% $SiO_2$ and 1.0% each of MgO and CaO are prepared by several processes.

(a) The process of the invention as described in Example 1 using 1860 parts of 1.6µ reactive grade $Al_2O_3$, 100.0 parts 1.1µ average range $SiO_2$, 46.9 parts of U.S.P. grade $MgCO_3$ and 35.5 parts of technical grade $CaCO_3$ and dry milling the calcined material as described in Example 1.

(b) The process as in (a) except that the calcined material is wet-milled for 6 hours using 3:1 ball:charge ratio.

(c) A batch as in (a) but without calcination step.

(d) Using 1806 parts of reactive $Al_2O_3$ and 35.5 parts $CaCO_3$ as in (a) but adding MgO and $SiO_2$ and part of the $Al_2O_3$ as 59.8 parts of talc and 136.3 parts of clay no prereaction of calcining step.

(e) As in (d) but including 3 hours prereaction at 1100° C. as in (a).

(f) As in (d) but using ceramic grade of $Al_2O_3$ with 4µ particle size.

(g) As in (f) but including 3 hours prereaction at 1100° C. and dry milling as in (a).

The above seven compositions were prepared by combining the powdered material with about 3% of polyvinyl alcohol as a binder for temporarily bonding particles, pressing 2.5 cm. (1 in.) diameter discs at about 1400 kg./cm.² (20,000 p.s.i.) pressure and firing for 3 hours at various temperatures until densification was achieved. Densification is established by dye-penetration test ASTM–D–116–65. The requisite temperatures (° C.) and densities in g./cm.³ are shown in Table 2.

TABLE 2

| Composition: | Densifying temperature | Density | Next higher temperature | Density |
|---|---|---|---|---|
| a | 1,425–1,450 | 3.64 | 1,500 | 3.67 |
| b | 1,425–1,450 | 3.61 | 1,500 | 3.67 |
| c | 1,425–1,450 | 3.53 | 1,500 | 3.56 |
| d | 1,500 | 3.54 |  |  |
| e | 1,450–1,475 | 3.55 |  |  |
| f | >1,550 | (¹) |  |  |
| g | 1,500 | 3.55 |  |  |

¹ Not densified.

It will be evident that the process in including compositions (a) and (b) provide a product of superior density at a lower maturing temperature. The process of preparing compositions (a) and (b) is the process of the invention.

EXAMPLE 3

This example shows results similar to those of Example 2 above except that MgO is not employed in these compositions which contain 93% $Al_2O_3$, 3.5% $SiO_2$ and 3.5% CaO.

(a) A batch of 1860 parts reactive 1.6µ alumina, 124.2 parts $CaCO_3$ (technical grade) and 70.0 parts of 1.1µ fine silica is wet-milled 2 hours, dried and prereacted or calcined for 3 hours at 1100° C. It is then dry-milled for 10 hours with 10:1 ball:charge ratio using 1% triethanolamine as grinding aid.

(b) As in (a) but wet-milling the calcined material for 2 hours with 3:1 ball to dry charge ratio.

(c) As in (a) but calcined material processed without milling.

(d) As in (a) but not prereacted.

(e) As in (a) using reactive 2.5µ alumina, i.e., dry milled.

f) As in (a) using a 4µ alumina of conventional ceramic grade.

(g) As in (f) using clay as source of $SiO_2$.

The results obtained by the methods of Example 2 are shown in the following table.

TABLE 3

| Composition: | Densifying temperature | Density |
|---|---|---|
| a | 1,375–1,400 | 3.71 |
| b | 1,400–1,425 | 3.66 |
| c | 1,400–1,425 | 3.60 |
| d | 1,400–1,425 | 3.56 |
| e | 1,400–1,425 | 3.64 |
| f | 1,450–1,475 | 3.58 |
| g | 1,550 | 3.55 |

Composition (e) could be further densified to 3.68 at 1500° C. and to 3.70 at 1525° C. It is evident that compositions (a), (b) and (e) densify readily as is expected of compositions made by the process of the invention. Composition (c) shows that milling of prereacted material in the process of the invention is desirable but not essential and for that reason is preferred.

EXAMPLE 4

This example illustrates use of a composition of the invention in a leathery green tape containing polymer binder of the type described in U.S. Pat. 2,966,719. A composition containing 3.5% each CaO and $SiO_2$ is prepared as in (a) of Example 3 except that wet-milling of the calcined material is continued for 6 hours and the material is then collected and dried. It is blended in plasticized polyvinyl butyral (about 20–30%) and cast on a flexible support and dried to give a film about 0.6 mm. (0.025 in.) thick. Samples of this leathery green sheet are cut and fired dense at temperatures of 1375, 1400 and 1425° C. to give densities of 3.60, 3.68 and 3.69 g./cm.³ respectively.

These samples show modulus of rupture values in the range of 40,000–60,000 p.s.i. and average grain size of 1 to 2μ. Electrical properties are, for example, loss factor of 0.0042 or less and dielectric constant of 9.63.

EXAMPLE 5

A number of compositions are prepared with increasing content of $Al_2O_3$ using the materials used in compositions of the invention above. Maturing temperatures and fired densities (which tend to be lower for lower $Al_2O_3$ contents) are determined for compositions as given in Table 4.

TABLE 4

| $Al_2O_3$ percent | $SiO_2$ percent | CaO percent | MgO percent | Maturing temperature, °C. | Fired density, g./cm.³ |
|---|---|---|---|---|---|
| 80 | 10.0 | 10.0 | | 1,350–1,400 | 3.42 |
| 85 | 7.5 | 7.5 | | 1,350–1,400 | 3.55 |
| 90 | 5.0 | 5.0 | | 1,350–1,400 | 3.61 |
| 93 | 3.5 | 3.5 | | 1,400–1,425 | 3.66 |
| 95 | 2.5 | 2.5 | | 1,400–1,425 | 3.71 |
| 97 | 1.5 | 1.5 | | 1,475–1,500 | 3.80 |
| 99 | 0.5 | 0.5 | | >1,500 | |
| 93 | 2.33 | 2.33 | 2.33 | 1,400–1,425 | 3.69 |
| 95 | 1.67 | 1.67 | 1.67 | 1,425–1,450 | 3.74 |
| 97 | 1.00 | 1.00 | 1.00 | 1,475–1,500 | 3.76 |
| 99 | 0.33 | 0.33 | 0.33 | >1,550 | |

It will be obvious as discussed above that FIG. 1 shows an intercept of a volume in the quaternary system which includes useful compositions up to 97% alumina. Although it is not contemplated as desirable in preferred embodiments of the invention it is believed that small amounts of other minor oxide additions may be tolerated in these compositions especially fortuitous amounts present as impurities.

EXAMPLE 6

Because measurement of temperatures in the ranges at which these compositions mature is not exact, this example illustrates densification as obtained in three different kilns at nominally the same temperatures (1425° C.). The kilns designated A, B and C are respectively batch type electrically heated (used in the above examples), a small continuous electrically heated furnace and a batch type gas-fired furnace. Samples corresponded to Example 3(a), (b) and (e) and Example 5 95% $Al_2O_3$ with 2.5% each of $SiO_2$ and CaO. The densities are in g./cm.³.

TABLE 5

| Example | 3(a) | 3(b) | 3(e) | 5 |
|---|---|---|---|---|
| Kiln A | 3.71 | 3.66 | 3.64 | 3.71 |
| Kiln B | 3.72 | 3.69 | 3.65 | 3.74 |
| Kiln C | 3.73 | 3.70 | 3.69 | 3.75 |

It will be seen that excellent densification was obtained in all cases with these compositions of the invention.

EXAMPLE 7

This example further illustrates two preferred compositions of the invention.

Two ceramic frits are prepared by the above generally described methods in accordance with the following tabulation:

| | Ceramic frit (I) | Ceramic frit (II) |
|---|---|---|
| $Al_2O_3$ (99.7%; 1.5 μ particles), kg | 1.86 | 1.86 |
| $CaCO_3$, g | 124.2 | 82.7 |
| $MgCO_3$ (U.S.P. precipitated), g | | 109.5 |
| $SiO_2$ (fine ground, 1–2 μ), g | 70.0 | 46.6 |
| Water, kg | 2.0 | 2.0 |
| Ball-milled, hours | 2 | 2 |

Both are air dried, calcined, at 1100° C. for 3 hours and crushed to pass 8 mesh screen (about 0.2 mm. or less gravel size. Each is dry ball-milled with 20 g. triethanolamine and 10/1 ball/charge ratio for about 10–15 hours.

The finely powdered ceramic frits are incorporated with organic binder and solvent as described in U.S. Pat. 2,966,719 mentioned above and cast into leathery green sheets or tapes as described in that patent.

Samples of the leathery green sheets are fired to establish electrical and mechanical characteristics. Ceramic frit I matures at about 1400° C. and Ceramic frit II about 1375° C. The ceramics are almost identical in properties with fired density 3.75, multicrystalline with average crystal size 1 to 2μ, flexural strength about 50,000 to 75,000 p.s.i. The dielectrical constant is 9.63 for each, dissipation factor 0.0004 to 0.0005, loss factor 0.004 to 0.005.

What is claimed is:

1. A prefired largely crystalline ceramic material substantially interreacted in the solid state, maturing to a ceramic on firing at 1300–1500° C. and having particles ground to sizes in the range of 0.5 to 10 microns after calcining an intimate blend of finely divided relatively pure reactive components, in which the presence of alkali metals is avoided, for 2–5 hours at about 1100° to 1200° C., said reactive components being of about 0.5 to 10 micron and average less than about 2–3 micron size and said blend containing from 80 to 97% of reactive, micron size, at least about 99.7% pure $Al_2O_3$, not more than about one third of the balance being reactive relatively pure MgO or its equivalent as carbonate or other decomposable magnesium compound and the remainder being finely ground $SiO_2$ and relatively pure CaO in a ratio of from 5:1 to 3:5, or equivalent proportions of a compound decomposable to CaO; at least a portion of the $SiO_2$ and CaO in said ceramic material being present in anorthite and/or gehlenite and a portion of any MgO being present in spinel.

2. A prefired ceramic material according to claim 1 containing from 90 to 95% $Al_2O_3$ and maturable at 1350–1450° C.

3. As an article of manufacture a leathery green ceramic sheet consisting essentially of about 80–70% of the prefired largely crystalline ceramic material of claim 1 and about 20–30% of polymeric organic binder.

4. A process of producing a largely crystalline prefired ceramic material maturing to a ceramic on firing at about 1350–1500° C. comprising the step of
   (I) blending together, while avoiding the presence of alkali metals, finely divided reactive components of about 0.5 to 10 and average less than about 2–3 micron size consisting of 80 to 97% of reactive micron size at least 99.7% pure alumina, up to one third of the balance of reactive relatively pure finely divided MgO or its equivalent as carbonate or other decomposable compound, and the balance of finely ground $SiO_2$ and relatively pure CaO in a ratio by weight of 5:1 to 3:5, or equivalent proportions of a compound decomposable to CaO,
   (II) prereacting and calcining the blend at about 1100–1200° C. for about 2–5 hours thereby effecting substantial interreaction in the solid state with partial formation of anorthite, gehlenite and/or spinel, and thereafter grinding to sizes in the range of 0.5 to 10 microns.

5. A process for the production of multicrystalline alumina ceramic essentially free from glass or devitrified glass phase and having average particle size of about 1 to 3μ comprised of 80–97% alumina bonded essentially by 3 to 20% of crystals of one or more of spinel, anorthite and gehlenite characterized by firing to maturity at about 1300° to 1475° C. a green article consisting essentially of temporary polymeric organic binder which is lost on firing and prefired largely crystalline ceramic material substantially interreacted in the solid state containing about 80–97% $Al_2O_3$, up to about one third of the balance being MgO and the remainder being $SiO_2$ and CaO in a ratio of from 5:1 to 3:5; at least a portion of any said MgO being present as spinel and a portion of said $SiO_2$ and CaO being present as anorthite and/or gehlenite.

References Cited

UNITED STATES PATENTS

| | | | |
|---|---|---|---|
| 2,045,494 | 6/1936 | Riddle | 106—46 X |
| 2,414,367 | 1/1947 | Feichter | 106—46 X |
| 2,436,005 | 2/1948 | Hopps et al. | 106—46 |
| 2,966,719 | 1/1961 | Park | 106—39 |
| 3,262,754 | 7/1966 | Lindsay et al. | 106—65 X |
| 2,377,176 | 4/1968 | Wolkodoff et al. | 106—46 |
| 3,520,705 | 7/1970 | Shido et al. | 106—46 X |

FOREIGN PATENTS

| | | | |
|---|---|---|---|
| 805,337 | 12/1958 | Great Britain | 106—46 |

TOBIAS E. LEVOW, Primary Examiner

W. R. SATTERFIELD, Assistant Examiner

U.S. Cl. X. R.

106—46, 65; 264—61